US005239315A

United States Patent [19]

Takahashi

[11] Patent Number: 5,239,315

[45] Date of Patent: Aug. 24, 1993

[54] PENSTOCKER OF AUTOMATIC DRAFTING MACHINE

[75] Inventor: Isamu Takahashi, Tokyo, Japan

[73] Assignee: Mutoh Industries, Ltd., Tokyo, Japan

[21] Appl. No.: 764,293

[22] Filed: Sep. 23, 1991

[30] Foreign Application Priority Data

Dec. 12, 1990 [JP] Japan .............................. 2-402930[U]

[51] Int. Cl.[5] ........................ G01D 15/16; B43L 13/00

[52] U.S. Cl. .................................. 346/139 R; 346/49; 33/18.1

[58] Field of Search .................. 33/18.1, 18.2; 346/29, 346/49, 141, 139 A, 139 B, 139 R

[56] References Cited

U.S. PATENT DOCUMENTS 4,533,924 8/1985 Takahashi .............................. 346/49

4,754,288 6/1988 Lawrence .............................. 346/29

4,849,771 7/1989 Lawrence et al. .............. 346/139 R

*Primary Examiner*—Benjamin R. Fuller

*Assistant Examiner*—Alrick Bobb

*Attorney, Agent, or Firm*—Sughrue, Mion, Zinn, Macpeak & Seas

[57] ABSTRACT

A penstocker for an automatic drafting machine in which a shutter 15 is slidably mounted on a peripheral wall **13*b* of the penstocker's main body 10 such that a desired one or more slits 20, 21 and 22, formed on the peripheral wall 13*b***, are shielded thereby forming a predetermined pattern indicative of a presence or absence of the penstocker main body, a type of pen held by the penstocker main body and an origin of the penstocker main body.

3 Claims, 3 Drawing Sheets

PENSTOCKER OF AUTOMATIC DRAFTING MACHINE

BACKGROUND OF THE INVENTION

The present invention relates to a penstocker used for an automatic drafting machine in which the penstocker and a line drawing head can automatically and mutually exchange writing instruments such as pens.

In one example of an automatic drafting machine provided with a rotary penstocker, a plurality of slits 3 have been provided on the peripheral wall 2 of a rotary penstocker main body 1 having a plurality of pen holding portions 1*a*, as shown in FIG. 6. A light transmitting type object detecting sensor 5 is used to detect these slits 3. A controller discriminates the presence or absence of the penstocker, the type of pen held by the penstocker and an origin of the penstocker based on the detecting signals.

In this apparatus, the slits 3 are provided on the peripheral wall 2 of the penstocker main body 1. A slit arrangement pattern is changed by sticking an adhesive tape such as shield member 4, on the face of a desired slit or slits.

If a water ball pen, an ink pen or a ceramic pen have the same configuration, a penstocker having a pen holding portion for the water ball pen can also hold the ink pen or the ceramic pen. However, where the ink pen or the ceramic pen is held by this penstocker when the slit pattern of the penstocker is set for the water ball pen, it is necessary to apply adhesive tape to different slits so that the predetermined slit arrangement of the penstocker is modified to represent the ink pen or the ceramic pen. Thus, where the kind of pen to be held in the penstocker is predetermined, only that kind of pen may be accommodated unless the slit pattern is modified as, for example, by applying adhesive tape to the slits.

Thus, if it is desired to use many different kinds of pens in a single penstocker without exchanging pieces of adhesive tape on the slits, it is necessary to change the stocker data of a controller each time a different pen is to be used.

An object of the present invention is to solve the above-mentioned problems.

SUMMARY OF THE INVENTION

A penstocker for an automatic drafting machine in which a shutter 15 is mounted on the peripheral wall 13*b* of a penstocker main body 10 so as to be movable along an outer circumference thereof, and the shutter 15 being moved along the peripheral wall 13*b* so that a desired one or more slits of a plurality of slits 20, 21 and 22, formed on the peripheral wall 13*b*, are shielded or covered, for creating a predetermined slit arrangement pattern on the peripheral wall 13*b*, which pattern indicates the presence or absence of the penstocker, the type of pens held by the penstocker, the origin of the penstocker, etc.

DESCRIPTION OF THE PREFERRED EMBODIMENTS

The construction of the present invention will be described in detail hereinafter by referring to embodiments shown in the accompanying drawings.

Figure 1:
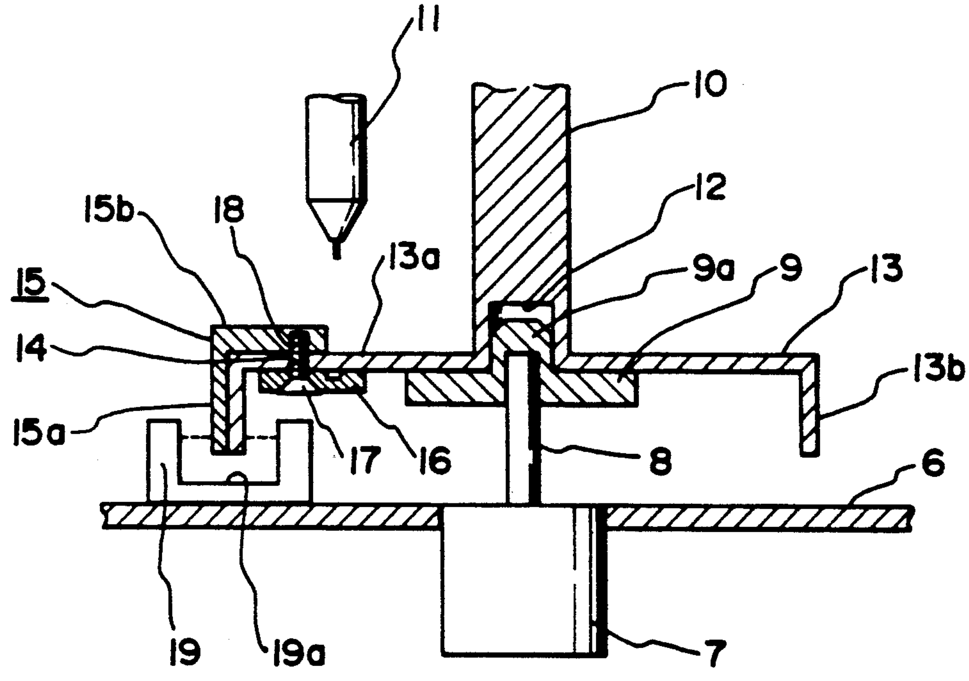
FIG. 1 is a front sectional view showing an embodiment of a penstocker of the present invention.
Figure 2:
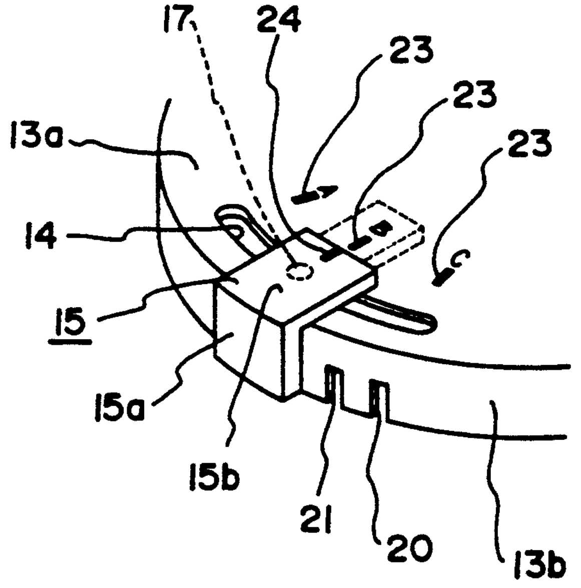
FIG. 2 is a partial perspective view of a penstocker of the present invention.

A motor 7 is fixed to a base plate 6 of an automatic drafting machine (FIG. 1). A disk like stocker holder 9 is affixed to the output shaft 8 of the motor 7. A fitting protrusion 9*a* protrudes from the stocker holder 9.

Figure 6:
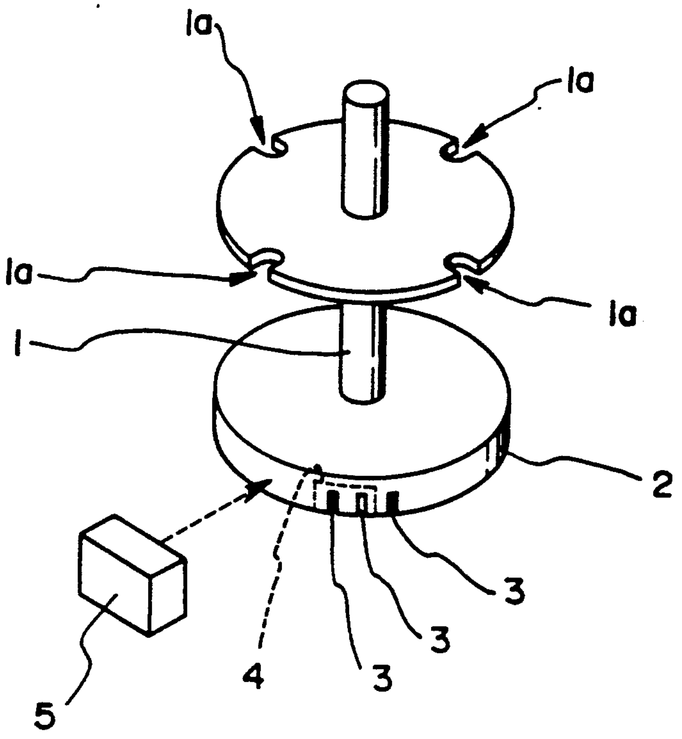
FIG. 6 is a perspective view showing one example of a penstocker.

A plurality of known pen holding portions (see FIG. 6) are formed along a circumferential direction of the upper disk like part of a penstocker main body 10. These pen holding portions hold pens 11 so as to be attachable thereto and detachable therefrom. A fitting recessed part 12 is formed at the lower end of the main body 10. The fitting protrusion 9*a* is fitted into the fitting recessed part 12, and thus the main body 10 can be connected to the output shaft 8 of the motor 7 so as to be attachable thereto and detachable therefrom. A cylindrical part 13 is formed on the lower end of the main body 10. A groove 14 of predetermined length is bored along the peripheral face of a peripheral wall 13*b* on the horizontal plate part 13*a* of the cylindrical part 13. A shutter 15 consists of a shield part 15*a* having a peripheral face with the same curvature as that of the peripheral face of the peripheral wall 13*b*, and an engaging part 15*b* extending in a direction orthogonal therewith. The inner peripheral face of the shield part 15*a* slidingly abuts against the outer peripheral face of the peripheral wall 13*b*. The lower face of the engaging part 15*b* slidingly abuts against the horizontal plate part 13*a* of the cylindrical part 13. A screw 17 is inserted into a screw inserting hole which opens on a plate like positioning member 16. Said screw 17 is threaded into a threaded hole 18 bored on the engaging part 15*b*. When the screw 17 is unfastened from the threaded hole 18, the shutter 15 can slide along the outer peripheral face of the cylindrical part 13. The screw 17 is tightly fastened or threaded into the threaded hole 18 so that the shutter 15 can be fixed in an appropriate position on the cylindrical part 13. A light transmitting type object detecting sensor 19 is disposed on the base plate 6. The peripheral wall 13*b* of the penstocker main body 10 is arranged in its detecting recessed part. On the peripheral wall 13*b* are provided slits 20, 21 and 22 which are located in the movement path of the shield part 15*a* of the shutter 15 and serve to encode the presence or absence of the penstocker, the kind of pens held, an origin of the penstocker, etc. A predetermined number of slits 21, 21 and 22 are provided on the peripheral wall 13*b*. Penstocker main body 10 is placed at a predetermined pen change position by rotating the penstocker main body 10 using the motor. Thus, the pen holding portion located at this pen change position and a drawing head (not shown) of an automatic drafting machine can mutually exchange pens.

In the figures, 23 denotes a positioning mark and 24 a positioning line.

Figure 3:
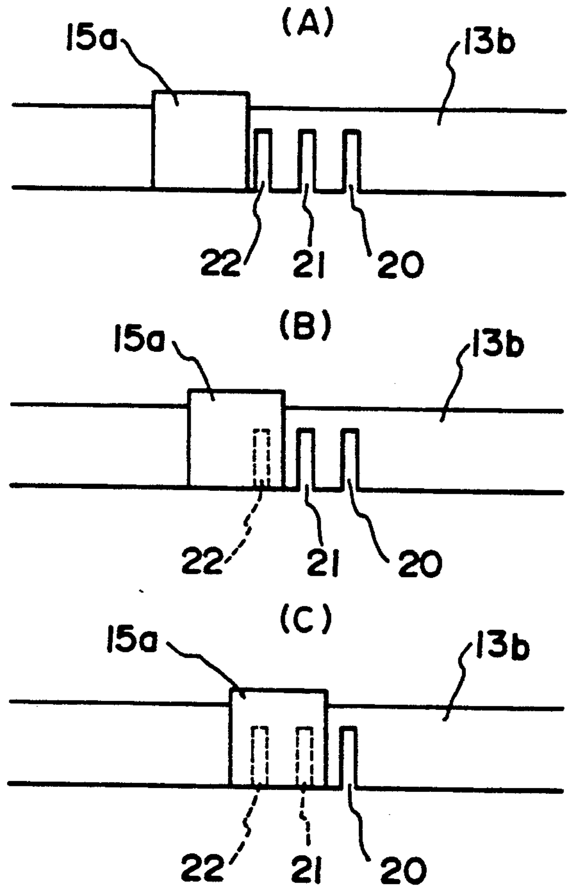
FIGS. 3(A), (B) and (C) are explanatory views showing the operation of the penstocker according to the present invention.

In the penstocker of the above described construction, the shield part 15*a* of the shutter 15 may be set to a position shown in FIG. 3(A). The penstocker main body 10 is rotated, using the motor 7, so as to move the slits 20, 21 and 22 on peripheral wall 13*b* to a position adjacent to the detecting recessed part 19*a* of the sensor 19. Then, the sensor 19 detects the presence or absence of slits 20, 21 and 22.

A controller recognizes the origin of the penstocker main body 10 using slit 20, and that the kind of a pen held by the penstocker main body 10 belongs to one of three kinds by using the slits 21 and 22. When kinds 1 to 3 are respectively input in the controller of the automatic drafting machine as that of a pencil, a ball pen and a ceramic pen, the controller at the position of FIG. 3(A) recognizes the type of pen and can further discriminate whether the penstocker main body 10 is a penstocker to be designated for use in plotting or drafting for example. When the sensor 19 detects the slits 20 and 21 in FIG. 3(B), by shielding the slit 22 by the shutter 15, the controller recognizes the origin and the stocker of a first particular kind. When the sensor 19 detects the slits 20, 21 and 22 in FIG. 3(A), whereby none of the slits are shielded, the controller recognizes the origin and the stocker of a second particular kind. When the sensor 19 detects only the slit 20 in FIG. 3(C), by shielding or covering the slits 21 and 22 by the shutter 15, the controller recognizes the origin and the stocker of a third particular kind.

Thus, the slit 20 located at the right end on the peripheral wall 13*b* in FIGS. 3A-3C indicates the origin, and the two slits 21, 22 adjacent to the slit 20 indicates the kind of pen being used. When only one slit 20 is exposed, the origin is determined and the pen is determined to be of a third particular kind. When all three slits 20, 21 and 22 are exposed, the origin is determined and the pen is determined to be of a second particular kind. When two slits 20 and 21 are exposed, the origin is determined and the pen is determined to be of a first particular kind. When the sensor 19 fails to detect the presence of slits, it is determined that there is no penstocker.

Figure 4:
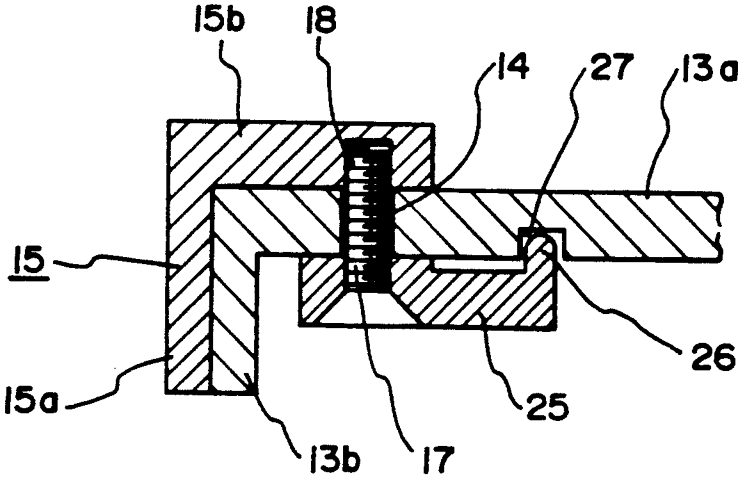
FIG. 4 is a cross sectional view showing one portion of another embodiment of a penstocker of the present invention.
Figure 5:
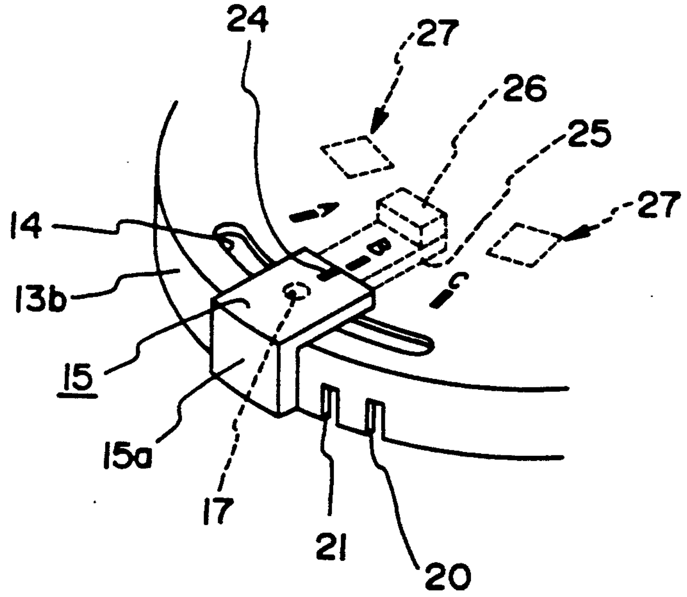
FIG. 5 is a partial perspective view of the same embodiment shown in FIG. 4.

The shutter 15 may be fixed by fastening the screw 17 as shown in FIG. 1 or by engaging a protrusion 26 of a positioning member 25 made of an elastic material into a locking recessed part 27 provided at a predetermined position on the lower face of the horizontal plate part 13*a* as shown in FIGS. 4 and 5.

In the penstocker shown in FIGS. 4 and 5, the movement of the shutter 15 is conducted such that an external movement force is manually applied on the shutter 15, the protrusion 26 of the positioning member 25 being detached from the locking recessed part 27, the screw 17 being moved along the groove 14 together with the shutter 15.

Since the penstocker of the present invention has the above described construction, many different kinds of pens can be readily discriminated by a single stocker. Furthermore, since a user can easily change a slit pattern, it is not necessary to prepare many penstockers when many kinds of pens having the same configuration are employed.

What is claimed is:

1. A penstocker for an automatic drafting machine, said penstocker comprising:

a rotary penstocker main body;

a plurality of slits provided along a peripheral wall of said penstocker main body;

a light transmitting, object detecting sensor for detecting said plurality of slits; and a shutter, slidably mounted on said peripheral wall so as to shield a predetermined slit or slits thereby encoding penstocker information including a presence or absence of the penstocker main body, an origin of the penstocker main body and a kind of pen or pens held by said penstocker main body.

2. A penstocker, as recited in claim 1, wherein said shutter comprises a shutter member and a resilient positioning member, and wherein said resilient positioning member includes a protrusion, said protrusion being accommodated within a recessed portion provided on said penstocker main body.

3. A penstocker, as recited in claim 2, wherein said penstocker main body is provided with at least one positioning mark, and wherein said shutter member is provided with at least one positioning line, said at least one positioning mark and said at least one positioning line together facilitating an alignment of said shutter over said predetermined slit or slits.

* * * * *